United States Defensive Publication [19] (H) [11] T969,008

Cogswell et al. [43] Apr. 4, 1978

[54] PRODUCTION OF ORIENTED FIBRILLAR PRODUCTS

[75] Inventors: Frederic Neil Cogswell, Welwyn Garden City; Jiri George Tomka, Harrogate, both of England

[73] Assignee: Imperial Chemical Industries Limited, London, England

[21] Appl. No.: 784,630

[22] Filed: Apr. 4, 1977

[30] Foreign Application Priority Data

Jan. 25, 1977 United Kingdom ..... 2951/77

[51] Int. Cl.[2] ..... C08G 73/08

[52] U.S. Cl. ..... 260/78.41; 264/176 R; 264/DIG. 47

[57] ABSTRACT

The process for the production of an oriented fibrillar product from a polyarylene-oxadiazole which is heat-softenable without substantial degradation when in an air-free inert atmosphere comprises extruding contiguously disposed particles of the polymer, which particles are heat-softened but non-molten and are blanketed in an air-free atmosphere of an inert fluid, through a die to produce a substantially non-degraded oriented fibrillar product. Means are provided, if necessary, to substantially prevent relaxation of the orientation resulting from the extrusion.

Particularly preferred polyarylene-oxadiazoles for use according to the process are the amorphous and non-crystallizable copolymeric polyphenylene-1,3,4-oxadiazoles having the characteristic repeating units

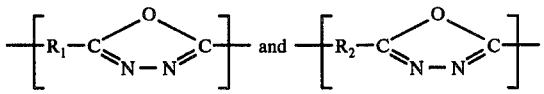

where $R_1$ is a p-phenylene radical, $R_2$ is a m-phenylene radical, the ratio of $R_1$ radicals to $R_2$ radicals is within the range 60/40 to 10/90, and the $R_1$ and/or $R_2$ radicals are sufficiently substituted with bulky groups such as bromine atoms to inhibit crystallisation of the polymer.

Preferably steam and/or water is the protective fluid and is derived from water associated with the polymer particles, the steam being formed by vaporization of the water during extrusion. The particles are usually in the form of a wet cake. The associated water may be present only as surface water (which has not significantly penetrated into the particles) or as water which has significantly penetrated into the polymer particles prior to extrusion. The use of liquid-interpenetrated particles is advantageous in that the vapor and/or compressed liquid provides a high pressure which provides a driving force for the extrusion and also the interpenetrated liquid flashes off from the extrudate leaving the die thereby rapidly cooling the extrudate throughout its thickness and freezing in the orientation.

The extrusion product is an attractive paper-like tape, ribbon or sheet comprised of very stiff fibrils and is usually rather porous. The product can be used as such, or when coextruded with other stiff fiber-forming polymers to obtain a highly reinforced extrudate. The fibrous extrudate can also be used as a base within the interstices of which other monomers may be polymerized.

17 Claims, No Sheets Drawing,

34 Pages Specification

The file of this unexamined application may be inspected and copies thereof may be purchased (849 O.G. 1221, Apr. 9, 1968).